Feb. 4, 1936.                E. HOFFMAN                2,029,320
SPOOL AND PROTECTOR THEREFOR
Filed Feb. 20, 1931
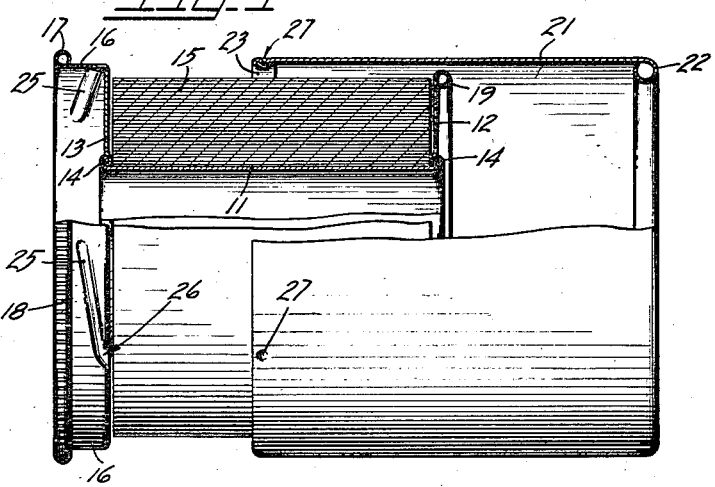
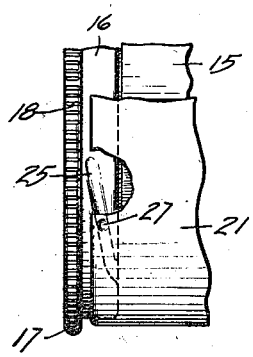
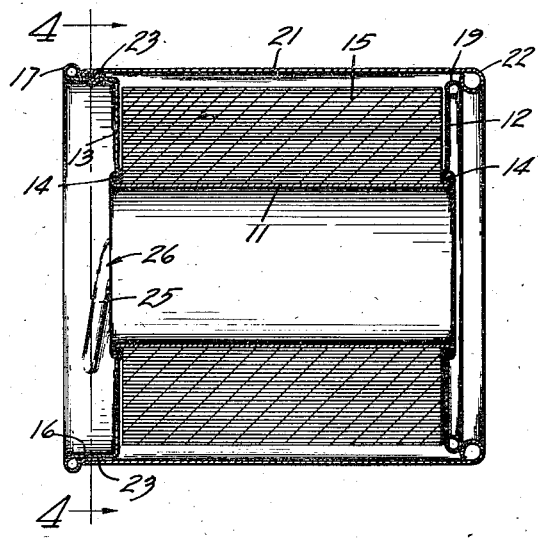
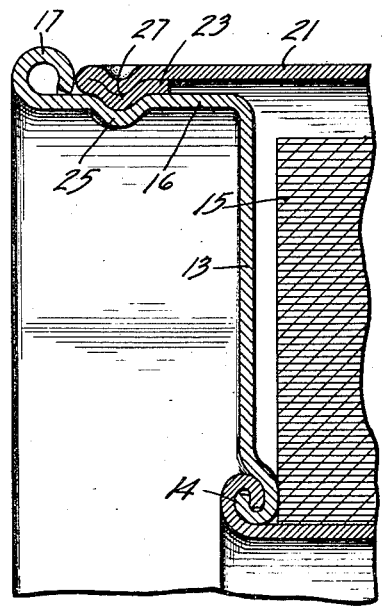
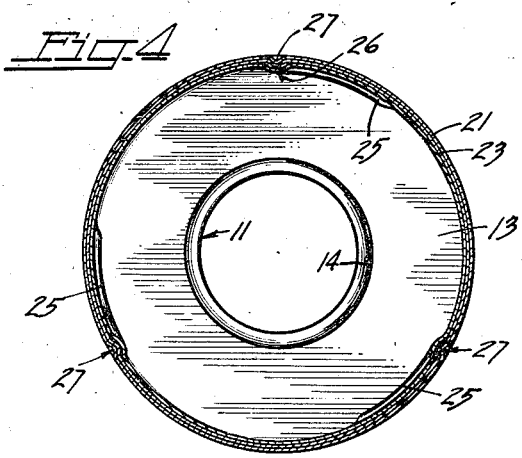
INVENTOR
Edmund Hoffman
BY John C. Carpenter
ATTORNEY Patented Feb. 4, 1936

2,029,320

UNITED STATES PATENT OFFICE 2,029,320

SPOOL AND PROTECTOR THEREFOR

Edmund Hoffman, Brooklyn, N. Y., assignor to American Can Company, New York, N. Y., a corporation of New Jersey Application February 20, 1931, Serial No. 517,220

4 Claims. (Cl. 206—52)

The present invention relates to a spool assembly and has particular reference to an improved construction wherein the spool may be retained in protected position within a protecting shell for storage and shipping purposes and when ready for use may be unlocked and forcibly removed from the shell by rotation thereof.

The principal object of the present invention is the provision of a simple form of spool having an improved spool head which cooperates with a protecting shell, into which the spool is inserted, to positively eject the same from its inserted position upon relative rotation between spool and shell.

An important object of the invention is the provision of a spool adapted for telescopic engagement within a protecting shell, the spool being held therein by a simple locking engagement.

An important object of the invention is the provision of a spool of improved construction adapted for telescopic engagement within a protecting shell and having a screw thread engagement for ejecting the spool from its protecting shell upon rotation thereof in one direction, and for locking it in protected position within the shell upon reverse rotation.

Numerous other objects of the invention will be apparent as it is better understood from the following description, which, taken in connection with the accompanying drawing, discloses a preferred embodiment thereof.

Referring to the drawing.

Figure 1 is a front elevation of a spool and its protecting shell, parts being illustrated in section, the spool being shown as partially withdrawn from the shell;

Fig. 2 is a fragmentary detail of one end of the spool assembly with the spool in inserted and locked position within its protecting shell;

Fig. 3 is a longitudinal section of the spool assembly illustrating the spool in fully enclosed position;

Fig. 4 is a transverse sectional view of the spool and protecting assembly being taken along the line 4—4 in Fig. 3; and Fig. 5 is an enlarged fragmentary view of one end of the spool inserted in its protecting shell.

The spool assembly unit illustrated in the drawing as a preferred exemplification of the invention, comprises a core member 11 having fixed heads 12 and 13 secured to its ends in any suitable manner, as by interfolded seams 14.

Tape 15 or other similar material, for which spool is intended to be used, is wound on the core 11 in the usual manner being located between the fixed heads 12 and 13. The head 13 is drawn into a smooth circular wall 16 which terminates in a curled edge 17 preferably knurled at 18 to provide a hand grip for the spool. The head 12 of the spool is also provided with an inwardly curled edge 19.

The protecting shell for the spool comprises a tubular body 21 having one edge bent inwardly into a curl 22. The edge of the shell at its opposite end is bent inwardly and is pressed back on itself at 23 providing a smooth wall for the mouth of the shell.

The spool containing its tape or other material is telescopically inserted endwise into the shell and through the end edge 23. During this insertion, the spool or the shell is rotated for a purpose hereinafter set forth. The wall 16 of the head 13 is passed inside of and adjacent to the edge 23 of the shell, the projecting curled edge 17 being brought against the edge 23. In inserted position the curl 19 of the spool head 12 engages the curl 22 of the shell 21, resiliency of the head 12 providing a relatively close fit between the curled members 19 and 22. This protects the spool from dirt or other contamination when not in use.

On the last part of the insertion movement, the spool is forcibly brought into a locked position within the shell by relative rotation between shell and spool, this rotation being easily effected by manual engagement with the knurled surface 18 of the curl 17. The wall 16 of the head 13 is grooved at intervals at 25, to provide interrupted screw threads, each groove extending at an angle to the face of the spool head 13 and terminating in a flared entrance portion 26.

Indentations 27 are struck inwardly from the outer wall of the shell 21 preferably in the region of its turned back edge 23 as illustrated in Figs. 1 and 5. There are three of these screw joints shown in the drawing although it will be evident that any desired number may be used. During insertion of the spool within its shell the flared mouth 26 of each thread section is first brought into register with one of the projections 27 formed in the shell 21 and either the spool or the shell is rotated to cause the projections 27 to move along their inclined grooves 25. This rotation forcibly moves the spool into its innermost position wherein the curl 19 of the spool head 12 engages the curl 22 of the shell, as previously described.

When the spool is to be removed from its protecting shell it is merely necessary to rotate the spool or the shell, which action causes the projections 27 to move backward along their inclined grooves 25 forcibly withdrawing the spool from its closed position within the shell. After the head 13 has reached a position where it is free of the projections 27, the spool may then be fully drawn out of the shell and access accordingly had to the tape or other material thereon.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A spool and protector assembly, comprising a spool having fixed heads one of which is provided with an outside longitudinally extended cylindrical wall, a protecting shell open at both ends and adapted to enclose said spool, and having an edge turned back on itself adjacent one end thereof, and an interrupted screw thread connection formed in the extended wall of said head and in the inner side of said turned back edge of said shell and effective upon rotation of said spool relative to said shell for locking said spool and shell together.

2. A spool and protector assembly, comprising a spool having fixed heads one of which is provided with an outside longitudinally extended cylindrical wall, a protecting shell open at both ends and adapted to enclose said spool, and having an edge turned back on itself adjacent one end thereof, and an interrupted screw thread connection formed in the extended wall of said head and in said turned back edge of said shell and effective upon rotation of said spool relative to said shell for forcibly separating said spool and shell.

3. A spool and protector assembly, comprising a spool having fixed heads one of which is provided with an outside longitudinally extended cylindrical wall the edge of which is extended outwardly in a projecting curl, a protecting shell open at both ends and adapted to telescopically receive and enclose said spool and having one edge turned back on itself and the other edge curled inwardly, and a screw thread connection formed in between the extended wall of said head and the inner side of said turned back edge of said shell for locking said spool in enclosed position with the said projecting curl of said head outside of and adjacent said turned back edge and with the opposite spool head in engagement with said inwardly curled edge of said shell.

4. A spool and protector assembly, comprising a spool having fixed heads one of which is provided with a cylindrical wall terminating in an outwardly curled hand-grip section, a protecting shell open at both ends and adapted to enclose said spool, and an interrupted screw thread connection formed in said cylindrical spool wall and in a part of said shell, which connection is adapted to interlock when the spool is in enclosed position, said screw thread being effective upon rotation of said spool by pressure applied on said hand-grip for locking said spool and shell together.

EDMUND HOFFMAN.